United States Patent Office 3,378,335
Patented Apr. 16, 1968

3,378,335
PREPARATION OF MIXED METAL OXIDES BY THERMAL DECOMPOSITION OF METAL SALTS
John David Ellis, Chalfont St. Giles, and Arthur Maxwell Nicholls, London, England, assignors to The Government of Israel as represented by the Director-General, the Director of Finance Division and the Accountant of the Ministry of Development
No Drawing. Filed Feb. 26, 1964, Ser. No. 347,375
6 Claims. (Cl. 23—51)

ABSTRACT OF THE DISCLOSURE

The present invention is a process for producing a magnetic metal oxide compound by disintegrating droplets of a feed solution containing at least two metal cations capable of forming a mixed oxide compound and at least one anion which with the metal cations constitute salts capable of thermal decomposition in a water vapor containing atmosphere. The decomposition results in the formation of the respective metal oxides. The droplets fall through a reaction vessel moving countercurrent to a contact stream of a hot gas in the presence of water vapor causing decomposition of the metal salts in the droplets and the formation of the magnetic oxide compound.

---

This invention concerns the production of mixed metal oxide compounds, especially, but not exclusively, those known as ferrites. The invention is particularly concerned with the production of such compounds by modifications of the process described in the specification of U.K. Patent No. 793,700 which discloses and claims a process for the thermal decomposition of magnesium, calcium, ferrous or ferric chloride or magnesium, ferrous or ferric sulphate, comprising the steps of disintegrating the salt in the molten state or as an aqueous solution into a suitably directed spray of predetermined length of path, contacting the spray with a stream of hot gas in the presence of water vapour in the case of a chloride, thermally decomposing the sprayed particles before they reach the end of said path, and separating the gaseous decomposition product from the escaping hot gas.

The conventional production of ferrites involves the intimate mixing of the appropriate finely-divided metal oxides in the required proportions, compaction and sintering of the mixture, followed by grinding the sintered compact to powder and then forming the desired shaped article which is finally fired at high temperature for an extended period. The sintering of the compacted mixture and the final firing of the shaped article result in combination of the oxides and the formation of a compound having the ferrite structure with its characteristic magnetic and electrical properties.

It has now been found that mixed metal oxide compounds may be produced from aqueous solutions containing two or more metal cations and one or more of certain anions, for instance halide such as chloride or bromide, nitrate, sulphate and carboxylic acid anions, by spraying such a solution into a reaction vessel in which the water of the sprayed droplets evaporates and the metal salts hydrolyze and decompose or decompose as the case may be, to the respective metal oxides so that an intimately mixed particulate oxide product is formed. It has further been found that, with appropriate choice of conditions in the reaction vessel, the particulate product formed is a mixed metal oxide compound which in appropriate cases has the ferrite structure.

In certain cases, equivalent results can be obtained by spraying aqueous melts, suspensions or slurries of insoluble or sparingly soluble metal salts into the reaction vessel, or by spraying non-aqueous solutions, melts, suspensions or slurries into a reaction vessel the atmosphere in which contains water vapour.

Thus the present invention provides a process for producing mixed metal oxide compounds by disintegrating into droplets a feed material solution, suspension, slurry or melt containing two or more metal cations capable of forming a mixed oxide compound and one or more anions that with the chosen metal ions constitute salts that thermally decompose in a water vapour-containing atmosphere into the respective metal oxides, such disintegration being performed in a reaction vessel in which the droplets contact a stream of hot gas such as to decompose the metal salts of the droplets whilst in free fall in such a stream into a particulate mixed oxide compound product.

Preferably the droplets in the reaction vessel move in countercurrent flow with respect to the hot gas, variation of the composition and temperature of such gas exerting a controlling influence on the course of the reaction within the vessel and thus on the chemical and crystallographic structure of the mixed oxide compound produced by such reaction.

The atmosphere within the reaction vessel may be oxidizing, reducing or neutral and in all cases will contain water vapour, usually from evaporation of the droplets. Control of the atmosphere may be effected, if desired, by the inclusion of appropriate constituents in the feed material disintegrated in the reaction vessel. For instance, the feed material may include organic materials such as organic acid salts of the chosen metals, which materials will react with oxygen in the atmosphere in the reaction vessel and/or (as in the case of oxalates) liberate carbon monoxide and carbon dioxide upon decomposition in the reaction vessel, thereby to reduce the proportion of oxygen in such atmosphere and/or to produce a chosen reaction vessel atmosphere constitution.

Control of the form of the mixed oxide compound product may be effected by varying other conditions within the reaction vessel. Thus, for a given feed material composition, different products may be obtained by variations of the droplet size, of the temperature and of the relative velocities of the droplets and reaction vessel atmosphere. Moreover, the initial concentration of metal salts in the sprayed droplets affects the form of the product.

Thus by control of the several variables mentioned, products of a wide range of compositions, structures and forms, particle size and bulk density may be obtained.

It will be understood that in the decomposition of certain metal salts, the corresponding acids or acid anhydrides are liberated and may be recovered and possibly utilized to make further feed material for spraying into the reaction vessel.

In a typical installation for carrying out a process based on the aforesaid discoveries, the reaction vessel comprises a vertical cylindrical, refractory lined, lagged column near the base of which hot gases are introduced, preferably tangentially from a suitable furnace or other source through one or more inlets, the column if desired terminating below the gas inlet(s), in a conical base to facilitate collection of the oxide product. Near its upper end, the column is equipped with spray nozzles or the like for introducing the solution, melt or the like feed material to be treated into the column in such manner as to form droplets that travel down the column in countercurrent to the ascending hot gases, the latter being led off via a duct which may convey the gases to a separator in which fine oxide particles entrained in the gas stream are recovered. From the separator, if provided, the gases are conveyed to an absorption system or acid plant.

The interior of the column may be regarded as three superposed zones through which the droplets fall, the upper zone serving for distribution of the droplets in the desired, usually central, portion of the cross-section, the lower zone serving for distribution of the incoming hot gases across the column cross-section, the bulk of the action occurring in the central zone where the gases and droplets move in countercurrent. The diameter of the central zone may conveniently be in the range 1.5 to 10 metres with a height in the range 0.5 to 5 metres. With such dimensions, the droplets and the said reaction products thereof have a total residence time, in direct countercurrent flow relationship with the gases, of a few seconds.

Using such an installation having a reaction vessel in the form of a column giving a central zone of diameter about 1.5 metres and operated so that the temperature in the lower zone was about 700° C. and the temperature in the exit gases was about 200° C., an aqueous solution containing 1% HCl, 24% $FeCl_2$ and 12% $ZnCl_2$ (actually a spent galvanising pickle liquor) was sprayed into the vessel under a gauge pressure of 30 lbs. per square inch at a rate of 17 gallons per hour to form droplets having a size range of about 50 to 200 microns. The exit gases were passed to a cyclone separator in which a powder mixture was recovered, this mixture being found to contain 32% $ZnCl_2$, 1% $FeCl_2$, 37% $Fe_2O_3$ and 30% of the zinc ferrite $ZnOFe_2O_3$. The exit gases after passing through the separator gave rise on absorption in water to an HCl concentration of 20% and $ZnCl_2$ and $FeCl_3$ concentrations of 0.1% and 0.2% respectively. At the base of the reaction vessel there was deposited a particulate product containing the zinc ferrite $ZnOF_2O_3$ and $Fe_2O_3$ but, surprisingly, no free ZnO in significant amounts. Thus, clearly, had the molecular proportions of zinc and iron in the aqueous solution been appropriately chosen, a purer yield of zinc ferrite would have been produced.

In other experiments with the same installation the results set out below were obtained.

Experiment 2

Feed solution: Percent (by weight)

| | |
|---|---|
| $FeCl_2$ | 17.8 |
| $FeCl_3$ | 1.5 |
| $ZnCl_2$ | 3.1 |
| HCl | 10.8 |

Solution fed at 17 gallons per hour.

Temperatures: ° C.

| | |
|---|---|
| Lower zone | About 700 |
| Exit gases | About 200 |

Product deposited at base of reactor:

Percent (by weight)

| | |
|---|---|
| $ZnOFe_2O_3$ | 4.9 |
| $Fe_2O_3$ | 88.9 |

Experiment 3

Feed solution (sp. gr. 1.324 at 11° C.):

Percent (by weight)

| | |
|---|---|
| $FeCl_2$ | 21.7 |
| $NiCl_2$ | 8.7 |

Solution fed at 20–21 gallons per hour.

Temperatures: ° C.

| | |
|---|---|
| Lower zone | About 600 |
| Exit gases | About 300 |

Product deposited at base of reactor:

Percent (by weight)

| | |
|---|---|
| $NiOFe_2O_3$ | 90 |
| $Fe_2O_3$ | 10 |

In this experiment, the feed solution had a constitution selected to provide, on decomposition, nickel and iron oxides in proportions corresponding to the empirical formula of the nickel ferrite. It is thought that the excess $Fe_2O_3$ obtained in the reactor product resulted from loss of $NiCl_2$ in the exit gases from the reactor.

The produced nickel ferrite was subjected to X-ray analysis both before and after heating for two hours at 900° C. The analysis after heating showed no evidence of a structural change in the ferrite.

It should be noted that in conventional production of this nickel ferrite, intimately mixed oxide powders have to be held at temperatures in the range 1000–1400° C. for a period of about twenty-four hours to achieve combination of the oxides and formation of the ferrite.

Experiment 4

Feed solution (sp. gr. 1.265 at 15° C.):

Percent (by weight)

| | |
|---|---|
| $FeCl_2$ | 23.4 |
| $BaCl_2$ | 3.2 |

Solution fed at 21 gallons per hour.

Temperatures: ° C.

| | |
|---|---|
| Lower zone | About 760 |
| Exit gases | About 350 |

Product deposited at base of reactor:

Percent (by weight)

| | |
|---|---|
| $BaO \cdot 6Fe_2O_3$ | About 5 |

The product was a free-flowing purplish-red powder of which about 50% by weight was magnetic. X-ray analysis showed that the product contained large quantities of $Fe_2O_3$ and about 2.5% chloride. Heating of the product for one and one-half hours at 900° C. reduced the chloride content to 0.07% and caused its colour to change to purple, but X-ray analysis of the so heated product indicated no change in structure.

The constitution of the ferrite, $BaO.6Fe_2O_3$, corresponds with that of barium ferrite obtained by heating mixed oxides in conventional ferrite-producing practice.

However, as the following experiment shows, another magnetic mixed oxide compound may be obtained by the method of the invention from a feed solution containing barium chloride and ferrous chloride.

Experiment 5

Feed solution (sp. gr. 1.227 at 15° C.):

Percent by weight

| | |
|---|---|
| $FeCl_2$ | 13.9 |
| $BaCl_2$ | 11.4 |

Solution fed at 17 gallons per hour.

Temperatures: ° C.

| | |
|---|---|
| Lower zone | About 650 |
| Exit gases | About 340 |

*Product deposited at base of reactor.*—The product was a magnetic powder which contained approximately 14% chloride although X-ray analysis showed no evidence of unconverted $BaCl_2$ in the product; the chloride content of the product was assumed to be due to HCl adsorbed on the powder. The bulk of the product appeared to be a mixed oxide compound of empirical formula $BaFeO_4$. When the product was heated for two hours at 900° C., the chloride content of the product was reduced substantially to zero, the so heated product being found to be substantially wholly the mixed oxide compound $BaFeO_4$.

In these experiments, the reactor was heated by the combustion products of a paraffinic fuel burnt with approximately 50% excess air. The fuel flow rate was 4–5 gallons per hour (the lower fuel flow rates giving the lower temperatures) and, in the case of the experiments in which the feed solution contained barium chloride, the fuel was of low sulphur content (0.06% S) to minimise the formation of barium sulphate in the reactor.

In certain circumstances, as is evident from the above experimental results, it may be found that the desired mixed oxide compound or ferrite may not be formed to the desired extent and the particulate product of the reaction vessel may contain appreciable proportions of the individual oxides of the desired compound, or undecomposed or partially undecomposed droplet contents. In such cases, the particulate product may be held, e.g. in a fluidized bed, in the lower part of the reaction vessel and subjected to hot gases to complete the compound-forming reaction. These hot gases may constitute the whole gaseous admission to the vessel or be of a selected composition to promote the compound-forming reaction and different from gases introduced at a higher level to constitute a proportion of the atmosphere within the central zone of the vessel.

By means of processes based on the aforesaid discoveries, mixed metal oxide compounds and ferrites may be obtained as the reaction vessel particulate product from solutions, melts or the like containing various metal salts, for example containing appropriate mixtures of such metal ions as cobalt, nickel, zinc, copper, manganese, molybdenum, barium and iron. Such processes facilitate the obtaining of a desired composition of the ultimate product in that it is easy to control the composition of the solution, melt or the like that is sprayed into the reaction vessel and intimate mixing of powders of different crystalline structure is not required as in conventional ferrite production technique. Moreover, for the production of ferrites such processes offer economic advantages over conventional processes in that the production of a desired ferrite may be carried out continuously and extremely rapidly in a single stage, and a consistent product may more readily be achieved. In addition, the ferrite-forming reaction proceeds at a lower temperature than by methods involving sintering of a mixed oxide compact.

Valuable mixed metal oxide compounds and ferrites may, by processes as above described, be recovered most economically from otherwise waste materials, for instance spent pickle liquors.

Mixed metal oxide compound and ferrite particles produced by such processes may be readily comminuted to sub-micron size.

We claim:
1. A process for producing a magnetic metal oxide compound, comprising: disintegrating into droplets a feed liquor containing at least two metal cations capable of forming a mixed oxide compound and at least one anion that with the said metal cations constitute salts capable of thermal decomposition in a water vapour-containing atmosphere into the respective metal oxides, such disintegration being performed in a reaction vessel in which the droplets move in countercurrent to and contact a stream of hot gas in the presence of water vapor under conditions to decompose the metal salts of the droplets, and to form said magnetic oxide compound in particulate form while the droplets and decomposition products are in free fall in said stream.

2. Process according to claim 1, wherein said particulate product is retained in fluidized state at a temperature and for a period such as to produce said magnetic oxide compound.

3. Process according to claim 1, comprising disintegrating a solution containing zinc chloride and iron chloride into droplets within a stream of water vapour-containing gas at a temperature of about 700° C. to effect decomposition of the salts of said droplets and formation of the zinc ferrite $ZnOFe_2O_3$.

4. Process according to claim 1, comprising disintegrating a solution containing nickel chloride and iron chloride into droplets and contacting said droplets with a stream of water vapour-containing gas at a temperature of about 600° C. to effect decomposition of the salts of said droplets and formation of the nickel ferrite $NiOFe_2O_3$.

5. Process according to claim 1, comprising disintegrating a solution containing iron chloride and barium chloride in proportions approximately corresponding with the composition of the ferrite $BaO.6Fe_2O_3$, and contacting said droplets with a stream of water vapour-containing gas at a temperature of about 760° C. to effect decomposition of the salts of the droplets and formation of said ferrite.

6. Process according to claim 1, comprising disintegrating a solution containing iron chloride and barium chloride in proportions approximately corresponding with the composition of the magnetic oxide compound $BaFeO_4$, and contacting said droplets with a stream of water vapour-containing gas at a temperature about 650° C. to effect decomposition of the salts of said droplets and formation of said compound.

References Cited
UNITED STATES PATENTS

| | | | |
|---|---|---|---|
| 2,974,008 | 3/1961 | Howatt | 23—51 |
| 2,985,506 | 5/1961 | Di Vita et al. | 23—51 |

FOREIGN PATENTS

| | | |
|---|---|---|
| 793,700 | 4/1958 | Great Britain. |

OSCAR R. VERTIZ, Primary Examiner.

HERBERT T. CARTER, Examiner.